United States Patent [19]

Farr

[11] Patent Number: 4,732,002

[45] Date of Patent: Mar. 22, 1988

[54] SERVO-ASSISTED MASTER CYLINDER ASSEMBLIES

[75] Inventor: Glyn P. R. Farr, Warwickshire, England

[73] Assignee: Lucas Industries public limited company, Birmingham, England

[21] Appl. No.: 77,005

[22] Filed: Jul. 21, 1987

Related U.S. Application Data

[63] Continuation of Ser. No. 822,053, Jan. 23, 1986, abandoned.

[30] Foreign Application Priority Data

Jan. 29, 1985 [GB] United Kingdom ............... 8502130

[51] Int. Cl.⁴ ............................................. B60T 13/20
[52] U.S. Cl. ........................................ 60/555; 60/556; 60/562
[58] Field of Search ............... 60/555, 562, 563, 556, 60/588, 589; 251/61

[56] References Cited

U.S. PATENT DOCUMENTS

| | | | |
|---|---|---|---|
| 3,257,811 | 6/1966 | Aiki | 60/555 |
| 3,332,322 | 7/1967 | Beck | 251/61 |
| 4,123,908 | 11/1978 | Bertone | 60/555 |
| 4,324,101 | 4/1982 | Farr | 60/562 |
| 4,404,803 | 9/1983 | Steffes | 60/563 |
| 4,419,862 | 12/1983 | Farr | 60/562 |
| 4,449,369 | 5/1984 | Dauvergne | 60/563 |
| 4,463,562 | 8/1984 | Taft | 60/555 |
| 4,483,144 | 11/1984 | Steffes | 60/563 |
| 4,524,584 | 6/1985 | Kobayashi | 60/562 |
| 4,534,171 | 8/1985 | Leiber | 60/563 |
| 4,625,516 | 12/1986 | Gaiser | 60/565 |

FOREIGN PATENT DOCUMENTS 1456205 11/1976 United Kingdom.
2004608 4/1979 United Kingdom.

*Primary Examiner*—Abraham Hershkovitz
*Attorney, Agent, or Firm*—Oldham, Oldham & Weber Co.

[57] ABSTRACT

A servo-assisted master cylinder assembly for a vehicle hydraulic braking system has a tandem master cylinder with primary and secondary pistons operative to pressurise primary and secondary pressure spaces for primary and secondary brake circuits. A servo chamber is defined behind the primary piston, and pressurisation of the servo chamber from a source of pressure fluid is controlled by a valve in response to an input force applied to the primary piston. The valve comprises a spool operated solely by pressure in the primary space and a bias force from servo pressure in a bias chamber and a spring. The secondary piston has a smaller effective area than the primary piston, so that the pistons are in abutment in their retracted positions. To reduce pedal travel, one of the brakes of the primary circuit can be supplied from the servo chamber instead of the primary pressure space.

6 Claims, 4 Drawing Figures

SERVO-ASSISTED MASTER CYLINDER ASSEMBLIES

This is a continuation of application Ser. No. 822,053, filed Jan. 23, 1986, now abandoned.

This invention relates to servo-assisted master cylinder assemblies for vehicle hydraulic braking systems of the kind comprising a master cylinder having a housing provided with a bore in which primary and secondary pistons work, the pistons being operative to pressurise respective primary and secondary pressure spaces defined in the bore, outlets from each pressure space for connection to respective primary and secondary brake circuits, and a servo chamber defined in the bore behind the primary piston; and a control valve assembly having valve means controlling pressurisation of the servo chamber from a source of pressure fluid, the valve means being operative in response to an input force applied to the master cylinder from a pedal.

A servo-assisted master cylinder of the kind set forth, where the servo pressure is applied directly to the primary piston, is usually more compact axially than a conventional assembly of a separate master cylinder and booster, where the servo pressure acts on the primary piston through a movable wall and an output member. This can be seen in G.B.-A-1 456 205, which has the further advantage that the control valve means is normally operated in response to the pressure in one of the braking circuits, which means that the clearances in the braking system are taken up before the valve means operates, so that pressure from the source is not wasted in taking up the clearances. However, it also has the disadvantage that it is necessary to arrange the assembly to ensure that there is adequate braking force available if that circuit fails. This tends to make the construction of the valve means in particular, and of the assembly in general, more complex and expensive to produce, which may outweigh the other advantages.

According to a first aspect of our invention, in a servo-assisted master cylinder assembly of the kind set forth, the control valve means is operable solely in response to pressure in the primary pressure space and a bias force, and the primary and secondary pistons are freely separable relative to each other for a maximum range of separation permitted by the bore, and the pressure-effective area of the secondary piston is less than the pressure-effective area of the primary piston, such that the primary and secondary pistons are substantially in abutment in their retracted positions.

The construction and operation of the valve means can be simple, as it operates solely in response to pressure in the primary space and the bias force. With such an arrangement, if the primary braking circuit fails the valve means cannot operate; in consequence there is no servo assistance for the secondary braking circuit. In a conventional master cylinder, where the pistons have the same effective area, operating the secondary piston in this situation would mean extra pedal travel and increased pedal effort. In a master cylinder, travel of the primary piston accommodates the fluid displacement in both brake circuits, whereas travel of the secondary piston accommodates the fluid displacement in only one circuit. Where the pistons have the same area, the primary piston travels further than the secondary piston so there must be a substantial separation between them in their retracted position, which accounts for the extra pedal travel and effort in operating the secondary piston if the primary circuit fails. In the present invention, we arrange the pistons to overcome this, without adding to the complexity of the construction by reducing the area of the secondary piston, so that it travels further to achieve a given displacement in the secondary circuit, and we arrange it to travel at least as far as the primary piston. Thus in their retracted positions, the pistons can be substantially in abutment, so that there is no extra pedal travel in operating the secondary piston when the primary circuit fails, and the reduced area also means that the pedal effort is not increased. The arrangement is preferably such that pedal travel and effort are substantially the same on failure of either braking circuit.

The control valve means controls communication of the servo chamber with an inlet for connection to the source of fluid pressure, and an outlet for connection to a reservoir for fluid.

The control valve means is preferably a spool valve, comprising a spool working in a bore. The pressure in the primary pressure space acts on one end of the spool, while the bias force acts on the other end. The bias force is provided by the pressure in the servo chamber and a bias spring.

Operation of the spool is controlled by the primary pressure and the bias force, but the amount the spool moves during operation depends on the displacement profiles of the primary piston and the spool. (The displacement profile is determined by the amount of fluid displaced by axial movement of a member through a given distance.) Preferably, the displacement profile of the primary piston is greater than that of the spool, so that a small movement of the piston results in a relatively greater movement of the spool. This means that the valve responds more quickly in operation, and reduces the lost-motion inherent in valve operation, in comparison with a conventional booster. The reduction in lost-motion also enables the spool to be arranged so that there is greater overlap between inlet and outlet ports controlled by the spool when these are both closed, thus reducing leakage.

Conveniently, the pressure in the primary pressure space acts on the spool through a diaphragm. This acts to separate the master cylinder system from the servo system, preventing fluid leakage between the two, and also permits the spool to move without seal friction.

The construction and arrangement of the valve means is therefore very simple. The primary and secondary pistons may also be arranged to ensure that the assembly is compact axially. This can be achieved by providing the primary piston with a seal for slidable sealing engagement with the bore, and arranging the secondary piston to work through a stationary seal in the housing.

It will be noted that it is simple to arrange the control valve spool so that the pressure in the servo chamber, the servo pressure, is substantially equal to the pressure in the primary pressure space. It is therefore convenient to use the servo pressure to operate the brakes of a vehicle in which the servo-assisted master cylinder assembly is installed.

According to a further aspect of our invention, in a vehicle hydraulic braking system incorporating a servo-assisted master cylinder assembly of the kind set forth for operating the primary and secondary brake circuits, each circuit supplying at least two vehicle brakes, at least one of the brakes normally supplied by the primary brake circuit is supplied from the servo chamber.

This has the advantage of reducing the pedal travel, as the travel of the primary piston is reduced since it does not have to accommodate as much fluid displacement in the primary brake circuit. This arrangement is particularly convenient when the servo pressure is substantially equal to the primary pressure.

Where the primary circuit normally supplies only one rear brake, the arrangement is such that the servo chamber supplies this brake. If the primary circuit normally supplies both rear brakes, the servo chamber supplies one of them.

Some embodiments of our invention are illustrated in the accompanying drawings, in which.

Figure 1:
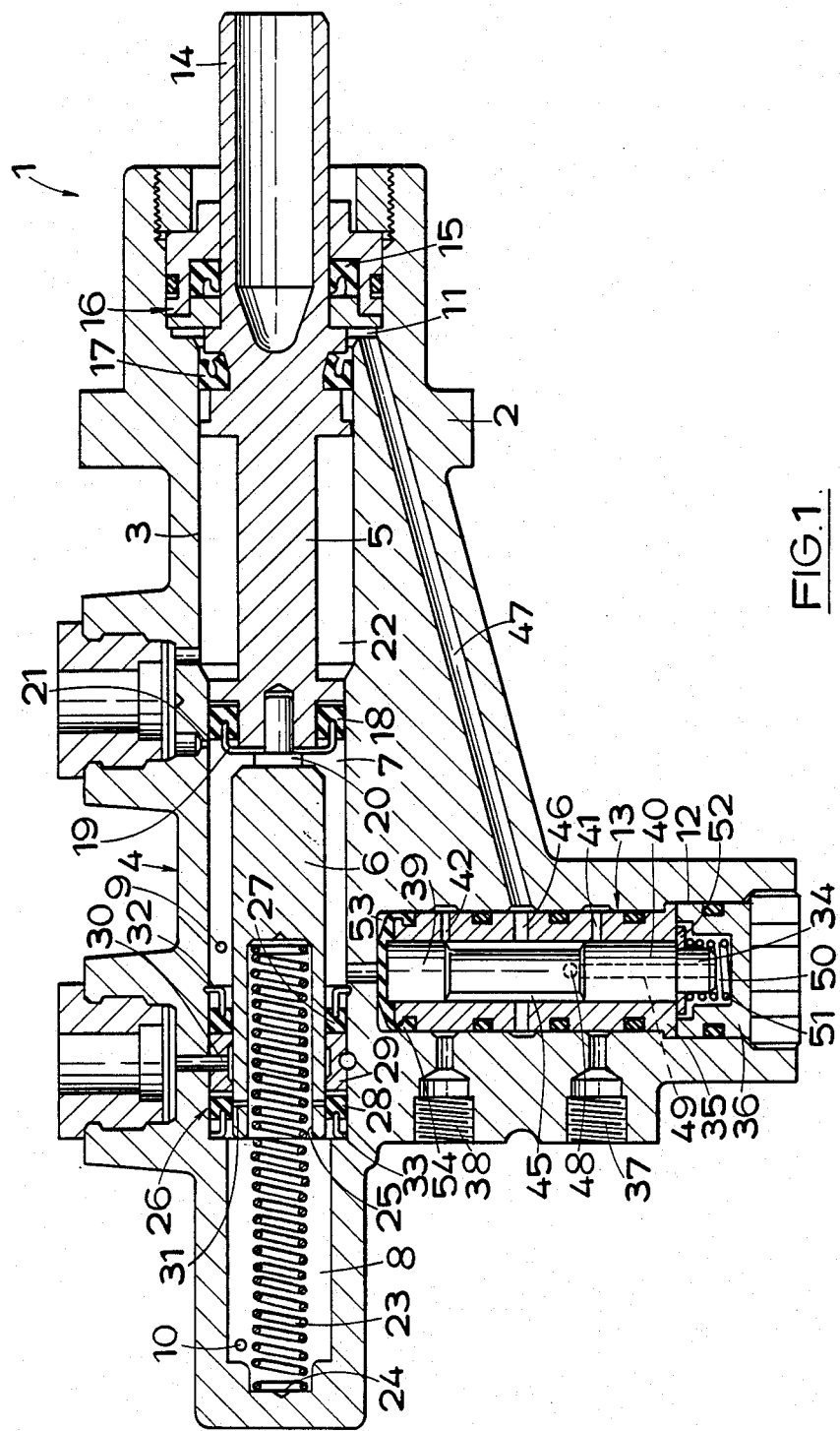
FIG. 1 is a longitudinal section through a servo-assisted master cylinder assembly.

FIG. 1 shows a servo-assisted master cylinder assembly 1 for a vehicle hydraulic braking system. The assembly 1 has a housing 2 with a longitudinal stepped bore 3 in which the master cylinder 4 is housed. A primary piston 5 and secondary piston 6 of the master cylinder work in tandem in the bore 3. The pistons are operative to pressurise respective primary and secondary pressure spaces 7, 8 defined in the bore 3, and outlets 9, 10 lead from the primary and secondary pressure spaces to respective primary and secondary brake circuits (not shown). A servo chamber 11 is also defined in the bore 3 behind the primary piston 5. The housing 2 has a transverse stepped bore 12 in which is located control valve means 13, which controls pressurisation of the servo chamber 11, in response to an input force applied to the primary piston 5 from a pedal (not shown).

The primary piston 5 is of stepped outline, and is located at the rearward end of the bore 3. The piston 5 has a rearward portion 14 which works through a seal 15 located in the bore 3 by an assembly 16. The seal 15 forms the rearward seal for the servo chamber 12, the forward seal 17 of which is carried by the primary piston 5. At its forward end the primary piston 5 is of reduced diameter, and carries a seal 18, which is retained on the piston by a clip 19 held by a stud 20. A radial recuperation port 21 in the housing provides communication between the primary pressure space 7 and a brake fluid reservoir (not shown), this communication being controlled by cooperation of the seal 18 with the port 21. An annular chamber 22 defined in the bore 3 round the primary piston 5 and between the seals 17 and 18 is permanently connected to the brake fluid reservoir.

The secondary piston 6 works in the forward end of the bore 3, and is freely separable relative to the primary piston 5. It has a smaller pressure-effective area than the primary piston 5, as it is of reduced diameter. The areas are so arranged that the travel of the secondary piston 6 during braking is substantially equal to the travel of the primary piston 5. In the retracted position shown, they are therefore in abutment. This enables a single master cylinder return spring 23 to be used, which acts between the closed forward end 24 of the bore 3, and the secondary piston 6, with part of the spring 23 accommodated in a recess 25 in the forward end of the piston 6. The secondary piston 6 works through an assembly 26 located in the bore 3. This assembly has two seals 27, 28, between which is a member 29 having the recuperation port 30 for the secondary pressure space 8. The first seal 27 forms a seal for the forward end of the primary pressure space 6. The second seal 28 co-operates with a radial passage 31 in the secondary piston 6 to control communication between the recuperation port 30 and the secondary pressure space 8. Retaining clips 32, 33 hold the assembly 26 in the bore 3.

The control valve means 13 controls pressurisation of the servo chamber 11 by controlling its communication with an inlet 37 connected to a source of pressurised hydraulic fluid (not shown) or an outlet 38 connected to a reservoir for hydraulic fluid (not shown). It comprises a spool 34 sliding in a sleeve 35 located in the bore 12 by a plug 36 at the outer end of the bore 12. The spool 34 has lands 39, 40 controlling flow through respective radial inlet and outlet ports 41, 42 in the sleeve 35 leading to the inlet 37 and outlet 38. A chamber 45 is defined in the sleeve 35 round a central portion of the spool 34 which is of reduced diameter, and this chamber is connected to the servo chamber 11 through a radial port 46 in the sleeve 35, and an inclined passage 47 in the housing. Radial and axial passages 48, 49 respectively in the spool 34 lead from the chamber 45 to a bias chamber 50 defined in the plug 36, pressure in the bias chamber acting to urge the spool 34 inwardly. A light bias spring 51 acts between the plug 36 and a circlip 52 on the spool 34 also to bias the spool 34 inwardly. A control chamber 53 is defined at the inner end of the bore 12, the chamber 53 being in communication with the primary pressure space 6. Pressure in the chamber 53 acts on the inner end of the spool 34 through a flexible sealing diaphragm 54. The diaphragm 54 is located by the sleeve 35, and provides a seal between the master cylinder and the valve means, without any seal friction on the spool 34 as it moves. In fact the diaphragm 54 provides a particularly effective seal between the master cylinder and servo systems, which is necessary as the fluid in the servo system may contain air bubbles which would adversely affect operation of the primary brake circuit.

Operation of the spool 34 is therefore controlled by the primary pressure acting in the control chamber 53 and a bias force provided by the pressure in the bias chamber 50 and the bias spring 51. The amount of movement of the spool 34 during operation is determined by the displacement profiles of the primary piston 5 and the spool 34, that is, the amount of fluid displaced by axial movement of these members through a given distance. In this case the displacement profile of the piston 5 is about five times greater than that of the spool 34, so 0.2 mm movement of the piston 5 results in 1 mm of movement of the spool 34. This improves the response time of the valve, and reduces the lost-motion inherent in valve operation. The reduction in lost-motion also means that there can be a greater overlap between the inlet and outlet ports 41, 42 when they are both closed by the spool 34, which reduces the leakage past the spool 34, making the valve means more efficient.

In the inoperative position shown, all the parts are in their retracted position, with the primary and secondary pressure spaces 7, 8 connected to the brake fluid reservoir, and the servo chamber 11 connected to the hydraulic fluid reservoir.

Application of an input force from the pedal to the primary piston 5 moves the primary and secondary pistons 5, 6 against the force in the spring 23. This movement firstly closes the respective recuperation ports, and then takes up the clearances in the braking system. Once the clearances are taken up, the pressure in the pressure spaces 7, 8 increases and starts pressurisation of the brake circuits. The pistons 5, 6 move substantially together during this. When the primary pressure, which is also present in control chamber 53, produces a force on the spool 34 sufficient to overcome the force in the spring 51, the spool 34 moves outwardly. This closes the outlet port 42, cutting off the chamber 45 from the outlet 38, and then opens the inlet port 41, allowing high pressure fluid to flow from the inlet 37 to the chamber 45, and thence to the servo chamber 11, where it acts on the primary piston 5 to augment the master cylinder output. Servo pressure in the servo chamber 11 is also present in the bias chamber 50, where it acts in opposition to the control pressure in the chamber 53. Once the servo pressure is substantially equal to control pressure, it moves the spool 34 into its balanced position, with both the inlet and outlet ports 41, 42 closed.

When the input force is removed, the pressure in the spaces 7, 8 is reduced, which allows the return spring 23 to return the master cylinder parts to their retracted positions. Reduction of primary pressure also enables the spool 34 to move outwardly, to re-open fluid communication between the servo chamber 11 and the hydraulic fluid reservoir.

If the servo pressure fails, the master cylinder 4 can simply be operated manually.

If the pressure in the primary pressure space rails, the valve means 13 is of course unable to operate, so that servo assistance is lost. However, the secondary brake circuit can be applied relatively easily. As there is no clearance to take up between the pistons 5, 6 the input force is applied immediately to the secondary piston through the primary pison, so there is no extra pedal travel. Further, the reduced diameter of the secondary piston 6 means that relatively less pedal effort is required to produce a given braking force.

If the pressure in the secondary brake circuit fails, the pistons 5, 6 move until the secondary piston 6 abuts the end 24 of the bore 3 (in this situation it will separate from the primary piston 5, due to the difference in their areas), and then the primary piston 5 can operate to pressurise the primary space 7, with servo assistance, as usual. In fact, in these two cases of failure, the pedal travel and effort required are substantially the same.

Operation of this servo-assisted cylinder assembly is therefore very similar to a conventional master cylinder with separate servo, but it has several advantages over a conventional arrangement. It is much simpler and more compact axially, and the valve means operates more quickly, and with less lost-motion. Further, the clearances in the system are taken up before the valve means operates, so that pressure from the source is not wasted in taking up these clearances.

Figure 2:
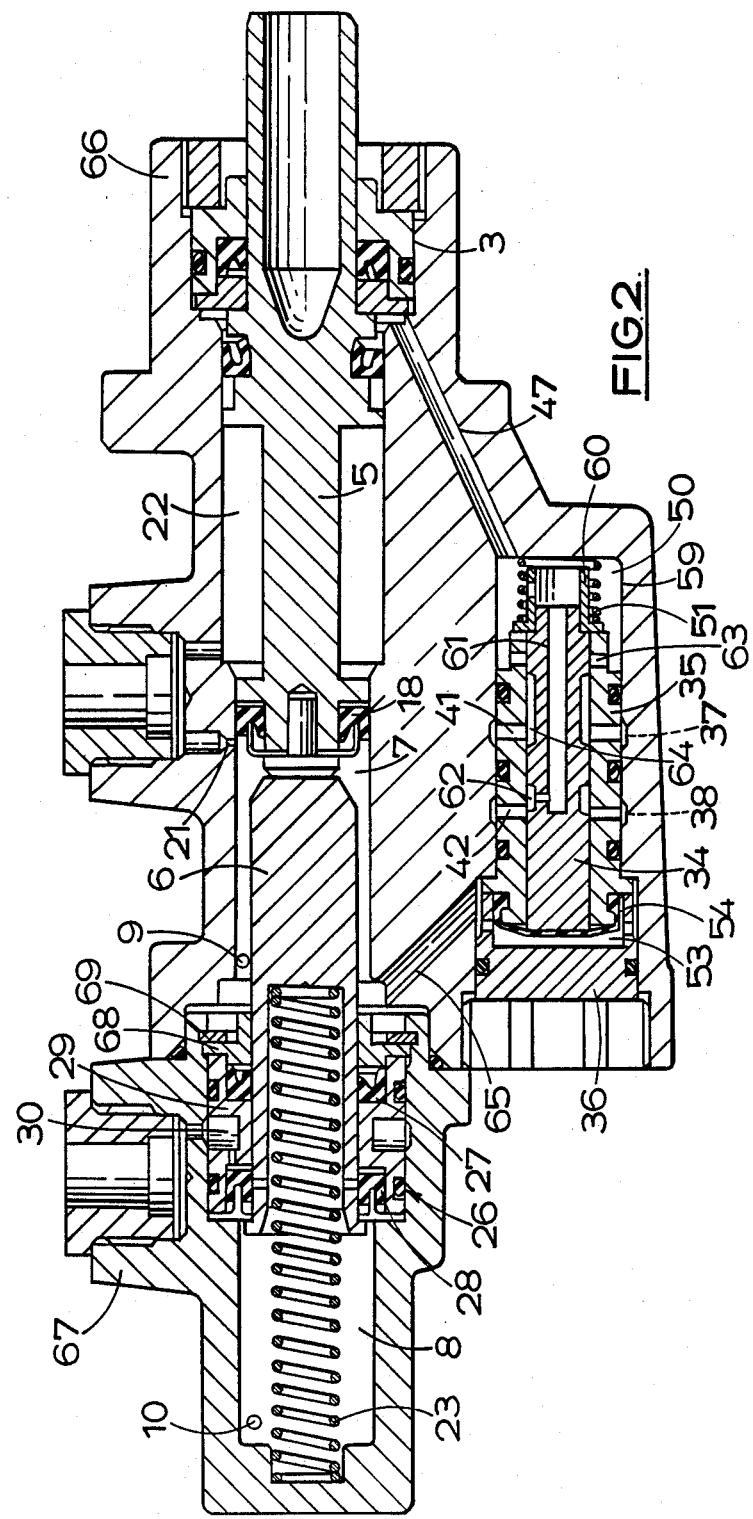
FIG. 2 is a view similar to FIG. 1, but showing a modification.

FIG. 2 shows a modification of the assembly of FIG. 1. In FIG. 2 the control valve means 13 is housed in a longitudinal bore 59, which simplifies production of the housing 2. The construction of the spool 34 is slightly different, in that the circlip 52 is replaced by a top hat member 60, and the chamber 45 is omitted, with the passage 47 connecting the servo chamber 11 directly to the bias chamber 50. The bias chamber 50 communicates with the outlet 38 through an axial passage 61 and radial port 62 in the spool 34 and the outlet port 42, and with the inlet 37 through a radial port 63 in the sleeve 35, annulus 64 on the spool 34 and inlet port 41. The control chamber 53 communicates with the pressure space 6 through an inclined passage 65.

A further modification is that the housing 2 is in two parts 66, 67 for ease of manufacture. The rearward part 66 houses the primary pressure space 7, while the forward part 67 houses the secondary space 8. This makes it easier to assemble the assembly 26 in the bore 3. The assembly 26 is also modified, with a modified member 29, which is retained not by clips 32, 33 but by a further member 68 and circlip 69.

The construction and operation of the assembly of FIG. 2 is otherwise the same as that of FIG. 1, and corresponding reference numerals have been applied to corresponding parts.

It will be noted that in the embodiments shown, the servo pressure is substantially equal to the pressure in the primary pressure space 7. It is therefore possible to use the servo pressure to operate the brakes, which can have the advantageous effect of reducing the pedal travel. Thus if servo pressure is supplied to one of the brakes of the primary circuit, instead of pressure from the primary space 7, the travel of the primary piston 5 does not have to accommodate as much fluid displacement in the primary circuit, so its travel, and thus the pedal travel can be reduced.

Figure 3:
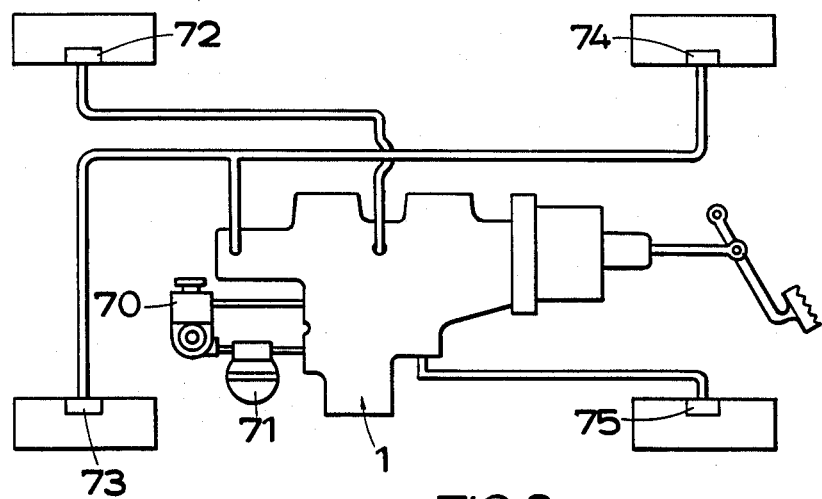
FIG. 3 is a scheme of a vehicle hydraulic braking system.
Figure 4:
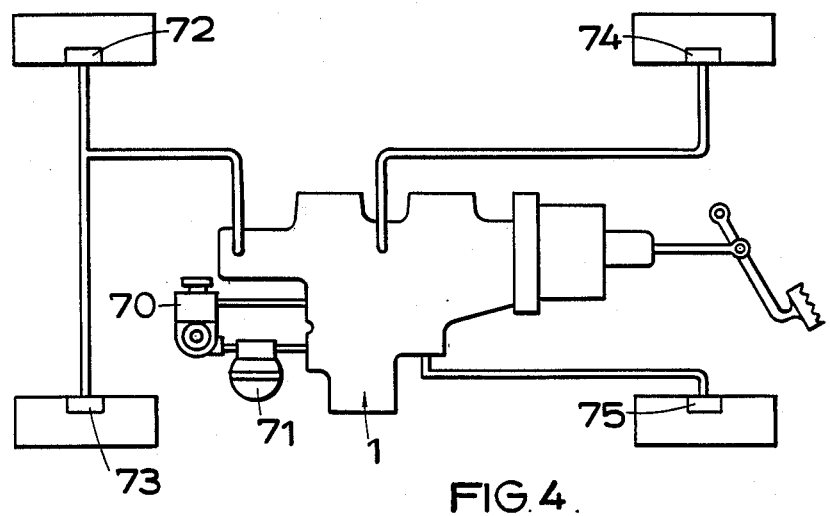
FIG. 4 is a further scheme of a vehicle hydraulic braking system.

FIGS. 3 and 4 show braking systems where this principle is used. In FIG. 3 a vehicle hydraulic braking system is shown, incorporating the servo-assisted master cylinder assembly of FIG. 1, for operating primary and secondary braking circuits. The pressure source for the servo is an accumulator 71 supplied by a pump 70. Four vehicle brakes 72,73,74,75 are shown (72 and 73 being front brakes). One front brake 73 and the diagonally opposite rear brake 74 are supplied by the secondary pressure space. Normally the other two brakes 72, 75 would be supplied by the primary pressure space. However, in this case only the front brake 72 is supplied by this primary pressure space, the rear brake 75 being supplied from the servo chamber.

FIG. 4 shows the same components as FIG. 3, but with the braking circuits arranged differently. Here the front brakes 72, 73 are supplied from the secondary pressure space, and one rear brake 74 is supplied from the primary pressure space, while the other is supplied from the servo chamber.

I claim:

1. A servo-assisted master cylinder assembly for a vehicle braking system comprising a master cylinder having a housing provided with first and second bores, primary and secondary pistons working in said first bore, each said piston having a pressure-effective area, means defining primary and secondary pressure spaces in said first bore, said primary pressure space being pressurized by operation of said primary piston and having an outlet for connection to a primary brake circuit, and said secondary pressure space being pressurized by operation of said secondary piston and having an outlet for connection to a secondary brake circuit, and means defining a servo chamber in said first bore behind said primary piston, said assembly also having a control valve assembly comprising valve means operative in response to an input force applied to said master cylinder to control pressurization of said servo chamber by fluid from a source of pressure, pressurization of said servo chamber acting on said primary and secondary pistons to augment said output force, said control valve means being operable solely in response to pressure in said primary pressure space and a bias force and comprising a spool working in said second bore, said primary pressure space and said spool being separated solely by an imperforate sealing diaphragm, on which pressure is said primary space acts directly on said spool, and said primary and secondary pistons being freely separable relative to each other for a maximum range of separation permitted by said bore, with said pressure-effective area of said secondary piston being less than said pressure-effective area of said primary piston, such that said primary and secondary pistons are substantially in abutment in their retracted positions.

2. A servo-assisted master cylinder assembly as claimed in claim 1, wherein said control valve means controls communication of said servo chamber with an inlet for connection to said source of fluid pressure, and an outlet for connection to a reservoir for fluid.

3. A servo-assisted master cylinder assembly as claimed in claim 1, wherein pressure in said primary pressure space acts through said diaphragm on one end of said spool, and said bias force acts on the other end of said spool.

4. A servo-assisted master cylinder assembly as claimed in claim 1, wherein said bias force if provided by the pressure in said servo chamber and a bias spring.

5. A servo-assisted master cylinder assembly as claimed in claim 3, wherein the displacement profile of said primary piston is substantially greater than that of said spool.

6. A servo-assisted master cylinder assembly as claimed in claim 1, wherein said primary piston carries a seal for slidable sealing engagement with said bore, and said secondary piston works through a stationary seal assembly in said housing.

* * * * *